United States Patent [19]

Cohen et al.

[11] Patent Number: 5,309,534
[45] Date of Patent: May 3, 1994

[54] OPTICAL FILTER HAVING MULTIPLE INTERFEROMETRIC STAGES

[75] Inventors: Leonard G. Cohen, Berkeley Heights; Charles H. Henry, Skillman; Rudolf F. Kazarinov, Martinsville; Mark E. Kuznetsov, East Brunswick, all of N.J.

[73] Assignee: AT&T Bell Laboratories, Murray Hill, N.J.

[21] Appl. No.: 21,702

[22] Filed: Feb. 24, 1993

[51] Int. Cl.$^5$ .............................................. G02B 6/26
[52] U.S. Cl. ...................................... 385/27; 385/24; 385/30; 385/42
[58] Field of Search .................... 385/27, 24, 30, 42

[56] References Cited

U.S. PATENT DOCUMENTS

| | | | |
|---|---|---|---|
| 3,936,144 | 2/1976 | Caton | 385/27 |
| 4,900,119 | 2/1990 | Hill et al. | 385/27 |
| 4,902,086 | 2/1990 | Henry et al. | 350/96.12 |
| 5,189,714 | 2/1993 | Okayama et al. | 385/27 |

OTHER PUBLICATIONS

M. Zirngibl et al., "Efficient 1×16 Optical Power Splitter Based On InP," *Electron. Lett.* 28, 1992, pp. 1212–1213.

M. Zirngibl, et al., "Demonstration of 15×15 Arrayed Waveguide Multiplexer on InP," *IEEE Photon. Technol. Lett.* 4, 1992, pp. 1250–1253.

R. Adar et al, "Adiabatic 3-dB Couplers, Filters, and Multiplexers Made with Silica Waveguides on Silicon", *J. Lightwave Technol.* 10, 1992, 46–50.

C. Bornholdt, et al., "Meander coupler, a novel wavelength division multiplexer/demultiplexer", *Appl. Phys. Lett.* 57, 1990, pp. 2517–2519.

R. C. Alferness, et al., "Vertically coupled InGaAsP-/InP buried rib waveguide filter", *Appl. Phys. Lett.* 59, 1991, pp. 2573–2575.

R. C. Alferness et al., "Grating assisted InGaAsP/InP vertical codirectional coupler filter", *Appl. Phys. Lett.* 55, 1989, pp. 2011–2013.

*Primary Examiner*—Frank Gonzalez
*Attorney, Agent, or Firm*—Martin I. Finston

[57] ABSTRACT

We describe an interferometric, channel-dropping, optical filter that includes a pair of planar waveguides. The two waveguides are spaced apart by a distance which is periodically varied along the longitudinal axis of the filter in order to effect a periodic optical coupling between them. There are at least three coupling locations, each associated with a coupling constant. The two waveguides have nominally equal effective refractive indices. In preferred embodiments of the invention, the coupling constants decrease symmetrically from the center of the filter toward the ends.

10 Claims, 3 Drawing Sheets

OPTICAL FILTER HAVING MULTIPLE INTERFEROMETRIC STAGES

FIELD OF THE INVENTION

This invention relates to passive components for processing optical signals, and more particularly, to those components that are fabricated as planar optical waveguides.

ART BACKGROUND

Wavelength-division multiplexing devices are of interest for the processing and distribution of signals in optical communication networks. One important technology for making such devices is silicon optical bench (SiOB) technology. In SiOB technology, planar optical waveguides, and devices based thereon, are fabricated on planar silicon substrates. A typical SiOB waveguide includes a lower silicon dioxide cladding, and a core and upper cladding of phosphosilicate glass deposited on the substrate and lithographically patterned. (SiOB methods are described, for example, in U.S. Pat. No. 4,902,086, issued to C. H. Henry, et al. on Feb. 20, 1990.) This technology is particularly useful for applications in the communication industry because it makes possible highly compact packaging of complex optical circuits, as well as integration of optical sources and detectors on the silicon substrates.

According to a second technology based on planar waveguides, the waveguiding components are manufactured form III-V semiconductor materials, rather than from silica-based materials. Aspects of this technology are described, e.g., in M. Zirngibl, et al., "Efficient 1×16 Optical Power Splitter Based on InP," *Electron. Lett.* 28 (1992) 1212–1213, and in M. Zirngibl, et al., "Demonstration of a 15×15 Arrayed Waveguide Multiplexer on InP," *IEEE Photon. Technol. Lett.* 4 (1992) 1250–1253.

Some designs for optical communication networks call for a wavelength-division multiplexer (WDM) capable of serving as a broadband, channel-dropping filter (or more generally, a channel adding/dropping filter). Such a device would, for example, have one input port and two output ports, to be denoted Ch. 1 and Ch. 2. In the absence of resonant effects, the input stream would be passed through to Ch. 2. However, input sub-channels having selected, resonant wavelengths would be directed to Ch. 1. By way of illustration, some proposed networks would carry communication signals in the 1.3 -$\mu$m and 1.55 -$\mu$m wavelength bands, and for fault-detection by optical time-domain reflectometry (OTDR), the same networks would carry diagnostic signals in the 1.42-$\mu$m band. A WDM filter would be useful for separating the two signal bands from the diagnostic band.

However, in optical communication networks, it will generally be desirable to avoid the use of filters with sharply peaked passbands. That is, it is possible that the lasers used for transmitting communication signals will not be perfectly stable in wavelength. Instead, environmental factors such as temperature changes may cause the transmission wavelengths to vary by as much as a few percent from the design wavelengths. A practical communication network will need to be tolerant of these wavelength variations. Optical filters, such as WDM filters, will be tolerant only if they have passbands that are not too sharply peaked near the wavelengths of maximum transmission.

Until now, however, at least some WDMs that are implementable using planar waveguide technology have had undesirably sharp transmission peaks. One such device is a SiOB Mach-Zehnder WDM, based on adiabatic 3-dB couplers. This device is described in R. Adar et al., "Adiabatic 3-dB Couplers, Filters, and Multiplexers Made with Silica Waveguides on Silicon", *J. Lightwave Technol.* 10 (1992) 46–50. This device had a transmission peak, centered on 1.55 $\mu$m, with a width at the 10-dB level of only 1%.

Another WDM based on planar waveguides is described in C. Bornholdt, et al., "Meander coupler, a novel wavelength division multiplexer/demultiplexer", *Appl. Phys. Lett.* 57 (1990) 2517–2519. The WDM described in Bornholdt is formed by patterning III-V materials deposited on an indium phosphide substrate. It employs periodic coupling between waveguides that differ in rib height, and therefore in effective refractive index.

One problem with this WDM is that it is relatively complex to manufacture. That is, after the waveguiding layer is grown, two etching steps are required to define the coupled waveguides. The first etching step defines the lateral dimensions of the waveguides, and the second step defines the difference in rib height between the waveguides. Moreover, the etching process used to define the rib heights has a typical accuracy no better than about 15%, and consequently it will be difficult for a manufacturer to maintain close tolerances on the center wavelengths of manufactured devices.

Thus, practitioners have until now failed to provide a WDM optical element that is relatively simple to manufacture to stringent tolerances, and that, in operation, will tolerate significant fluctuations of the transmission wavelengths.

SUMMARY OF THE INVENTION

We have invented a WDM, based on planar waveguides, that is readily made using SiOB technology or III-V planar waveguide technology. The spectral characteristics of this WDM depend on differences in geometrical path length to achieve differences in optical length, and therefore they do not depend on differences in rib height or effective refractive index. Because the respective rib heights are equivalent (i.e., nominally identical), the waveguide core layers can be fully defined in a single etching step. This WDM can be made with passbands that are tolerant of wavelength variations of a few percent about the peak wavelength. The drop in transmissivity due to such variations can be made less than 10 dB, and even as small as 1 dB or less.

Accordingly, the invention in one embodiment is an interferometric, channel-dropping, optical filter which includes first and second planar waveguides, having first and second effective indices of refraction, respectively. Associated with at least the first waveguide is a longitudinal axis. The two waveguides are spaced apart by a distance which is periodically varied along the longitudinal axis in order to effect a periodic optical coupling between the waveguides. There are at least three such coupling locations, each associated with a coupling constant. Significantly, the first and second refractive indices are nominally identical. In preferred embodiments of the invention, the coupling constants decrease symmetrically from the center of the filter toward the ends.

DETAILED DESCRIPTION

As noted, wavelength division multiplexed (WDM) optical systems require filters that select individual wavelength channels from the multiplexed signal stream. A so-called "channel-dropping filter" (or more generally, a channel adding/dropping filter) performs this function by transmitting one or more selected wavelength sub-channels in one of two output channels (denoted "Ch. 1") while transmitting the unselected sub-channels in the other output channel (denoted "Ch. 2").

Figure 1:
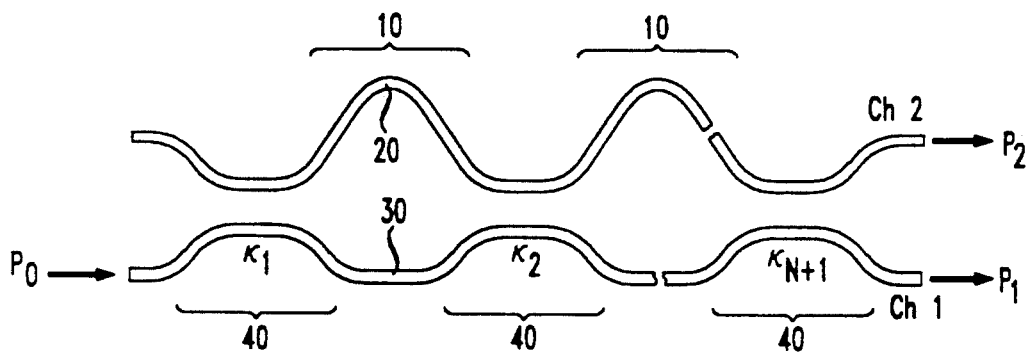
FIG. 1 is a schematic diagram of a channel adding/dropping filter according to the invention, in one embodiment.

Described below, with reference to FIG. 1, is a channel-adding/dropping filter constructed by cascading a plurality of Mach-Zehnder interferometric stages 10, each having a coupling strength between the long arms 20 and short arms 30. The coupling strengths are advantageously varied in such a way that the coupling is strongest for the center coupler and weakest for the two couplers at the respective ends of the filter. This is referred to below as "tapered" coupling, and the mathematical expression that describes this coupling is referred to as the "weighting function". Tapered coupling is advantageous because, inter alia, it can reduce the amplitude of the sidelobes that typically appear in the transmission spectra of these filters. Strong sidelobes are undesirable because they lead to crosstalk between Ch. 1 and Ch. 2. For at least some purposes, this crosstalk will be adequately suppressed if the sidelobe amplitude is reduced to less than $-30$ dB.

It is well known that a conventional Mach-Zehnder interferometer having directional input and output couplers can be used as a channel-adding/dropping filter. For 3-dB directional couplers, the power transmission $T_1$ (i.e., the ratio of power $P_1$ transmitted in Ch. 1 to the power $P_0$ input to the filter) of such a device is given by $$T_1 = \cos^2\left(\frac{\Delta\Phi}{2}\right).$$

Here $\Delta\Phi$ is a phase change given by $\Delta\Phi = \beta(S_1 - S_2)$, where $\beta$ is the propagation constant of guided radiation in the arms of the interferometer, and $S_1$ and $S_2$ are the lengths of the respective arms. With respect to the frequencies transmitted in, e.g., Ch. 1, this filter has a period $\Delta f_p$ given by $\Delta f_p = c/[n_g(S_1 - S_2)]$, where $c$ is the speed of light and $n_g$ is the group refractive index in the two arms. The two outputs are complementary; i.e., $T_1 + T_2 = 1$, where $T_2$ is the ratio of $P_2$ to the power $P_0$ input to the filter. Thus, a WDM input stream $P_0$ with channel separation $\Delta f_p/2$ will be divided between two outputs, with alternate channels going to the outputs $P_1$ and $P_2$. Such an optical filter can be implemented either with discrete optical fibers, or with an integrated optical device using planar waveguides.

The conventional device described above has only one stage which, as noted, is in the form of a Mach-Zehnder interferometer having arms of unequal lengths. By contrast, the inventive device includes a plurality of N such Mach-Zehnder stages. These stages will generally be equivalent, in the sense that propagating radiation will experience essentially the same optical path length difference $\Delta\Phi$ between the two arms in each stage. Between each pair of adjacent stages (and also on the input side of the first stage and the output side of the last stage) is a directional coupling section 40 which couples the upper and lower waveguides (as viewed in the figure) with a coupling coefficient $\kappa_i L_i$, where $i = 1, 2, \ldots, N, N+1$, $L_i$ is the length of the ith coupling section, and $\kappa_i$ is the coupling strength per unit length of the ith coupling section.

(Each of the $\kappa_i$ is a special case of the coupling strength per unit length, $\kappa$, between two waveguides. This coupling strength is defined with reference to two eigenmodes, a symmetric mode and an antisymmetric mode, which can propagate in the two-waveguide system. For light of a given vacuum wavelength $\lambda_{vac}$, the combined, two-waveguide system exhibits, for each of these modes, an effective refractive index $n_{eff}$ and a propagation constant equal to $$\frac{2\pi}{\lambda_{vac}} n_{eff}.$$

(The coupling strength $\kappa$ is one-half the difference between these propagation constants.)

The value of $\kappa_i$ decreases roughly exponentially with the separation between the upper and lower waveguides in the coupling section. The coupling can be tapered by varying either or both of the segment lengths $L_i$ and the coupling strengths $\kappa_i$. (In at least some cases, it will be undesirable to vary the segment lengths alone, because this may result in a filter that is relatively long.)

It should be noted in this regard that a channel-dropping filter based on periodically coupled waveguides has, in fact, been reported in C. Bornholdt, et al., cited above. In each stage of the Bornholdt filter, a phase difference accumulates as a result of different optical path lengths in the respective arms. However, unlike the inventive filter, the Bornholdt filter uses arms of equal geometrical length. The optical path length is made unequal by modifying the effective refractive index of one arm, relative to the other. This is achieved (in an implementation based on planar waveguides) by making the waveguide core thicker in one arm than in the other. In the inventive filter, by contrast, the effective refractive indices are nominally identical in the two arms.

The operation of the inventive filter depends on a resonance condition. That is, for certain wavelengths, the phase difference $\Delta\Phi$ will be an integer multiple of $2\pi$. For those wavelengths, the filter will behave as a single, long optical coupler having a total length $L_{tot}$, which is the arithmetic sum of the lengths $L_i$ of the individual coupling sections:

$$L_{tot} = \sum_{i=1}^{N+1} L_i.$$

As a consequence, at resonance there will be a full transfer of the input power to Ch. 1, provided that $L_{tot}$ is equal to one coupling length; i.e., provided that it satisfies the condition $\kappa_{eff} L_{tot} = \pi/2$, where $\kappa_{eff}$ is the effective coupling strength per unit length of the filter as a whole. By contrast, non-resonant signals will be passed through from the input to Ch. 2.

One advantage of a multiple-stage filter is that it can provide greater separation between resonant peaks than can a single-stage filter. Whereas a single-stage filter can be used for directing alternate channels (of the input signal) to Ch. 1, greater separation is generally required for selecting every n-th channel, where n is 3 or more. The degree of separation is often described in terms of the "finesse" F of the filter, defined as the ratio of the transmission period to the transmission peak width. For this purpose, the peak width is commonly measured either at 3 dB below the maximum transmissivity, or at 20 dB below maximum.

As noted, the coupling is desirably tapered by varying the coefficients $\kappa_i L_i$ according to an appropriate weighting function $w_i$. We have examined, through computer simulations, the response of a multistage filter having uniform coupling $w_i = 1$, cosine coupling $w_i = \cos\pi a(i-(N+2)/2)/N$, and binomial coupling given by $$w_i = B(N,i-1) = \frac{N!}{(i-1)!(N-i+1)!}.$$

If, for example, $\kappa_i$ is constant (i.e., the same for all segments of the filter), then each individual coupling length $L_i$ is given by $L_i = w_i L_{tot}/\Sigma w_i$. As above, N is the total number of stages, and in the case of cosine coupling, the argument of the cosine function changes phase by $$\frac{\pi a}{N} \text{ radians}$$

per filter stage.

Figure 2:
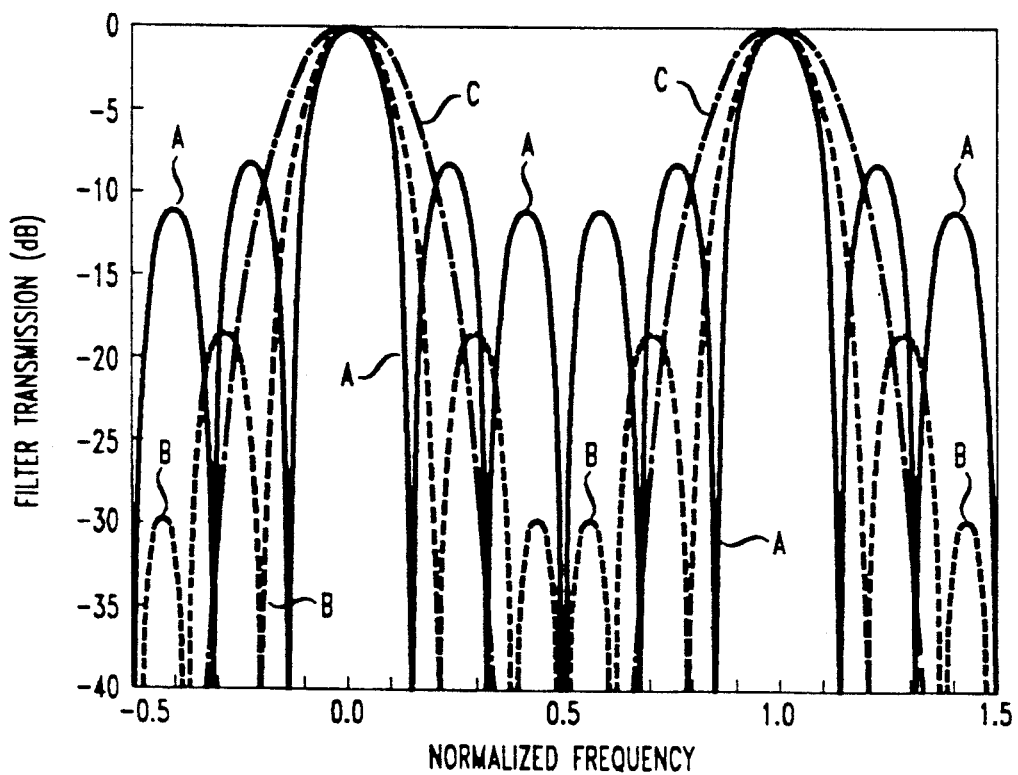
FIG. 2 shows the transmission spectra of illustrative embodiments of the inventive filter. In this figure, Curve A represents a filter with uniform weighting of the optical coupling sections, Curve B represents cosine weighting, and Curve C represents binomial weighting.

FIG. 2 is a transmission spectrum of a 5-stage filter. The horizontal axis represents frequency, normalized to the period $\Delta f_p$ of the filter. In the spectrum, curve A corresponds to uniform weighting, curve B corresponds to cosine weighting, and curve C corresponds to binomial weighting. It is apparent from the figure that with uniform weighting, the sidelobe amplitude is about $-8$ dB, that cosine weighting reduces this level to $-18$ dB, and that binomial weighting reduces it still further, to $-47$ dB. It is also apparent that as the sidelobe level is reduced, the transmission peak is broadened.

The main peak tends to become narrower, and the finesse tends to increase, as the number of stages is increased. We have found that for binomial weighting, the sidelobe level remains below $-45$ dB as N is increased, and the transmission function $T_1$ approaches $\cos^{2N}(\Delta\Phi/2)$; i.e., the N-th power of the single-stage transmission function.

Figure 3:
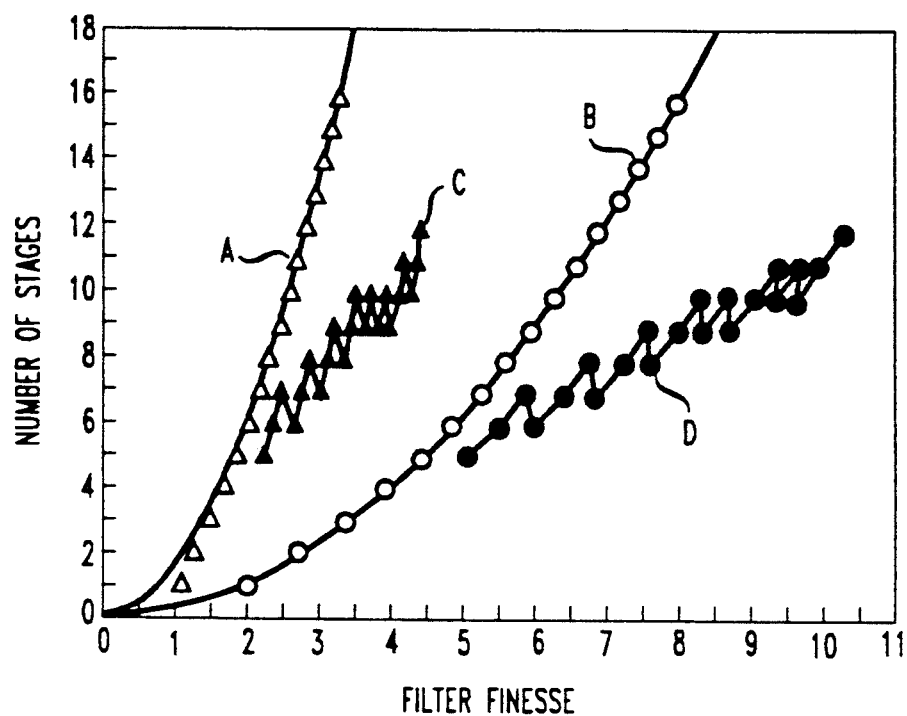
FIG. 3 is a graph which shows the number of filter stages required to achieve a given value of the filter finesse, for several illustrative embodiments of the inventive filter. Curves A and B represent binomial weighting without truncation, with finesse based on peak width at the $-20$ dB and $-3$ dB levels, respectively. Curves C and D represent truncated binomial weighting, with finesse based on peak width at the $-20$ dB and $-3$ dB levels, respectively.

Plotted in FIG. 3 is the theoretical number of stages required to achieve a given finesse in a filter with binomial weighting. Curves A and B correspond, respectively, to finesse calculations based on peak width at the $-20$-dB level and the $-3$-dB level. It is apparent from the figure that the number of required filter stages grows quadratically with the desired finesse. However, it is desirable to keep the total number of stages relatively low, in order to minimize the length of the resulting device and thus to facilitate compact packaging.

We have found that the number of stages is advantageously reduced by omitting the first one or more weights and the last one or more weights from the weighting function. Thus, for example, a 10-stage filter having the weights {1 10 45 120 210 252 210 120 45 10 1} can be reduced to a 6-stage filter having the weights {45 120 210 252 210 120 45}. Accordingly, a truncated binomial weighting function for an N-stage filter can be defined in terms of a binomial distribution of order M, from which the first and last r terms are dropped, so that N=M−2r. This function is described by $$w_i = B_T(M,r,i) = B(M,i-1+r),$$

where $i = 1, 2, \ldots M - 2r + 1$.

Figure 4:
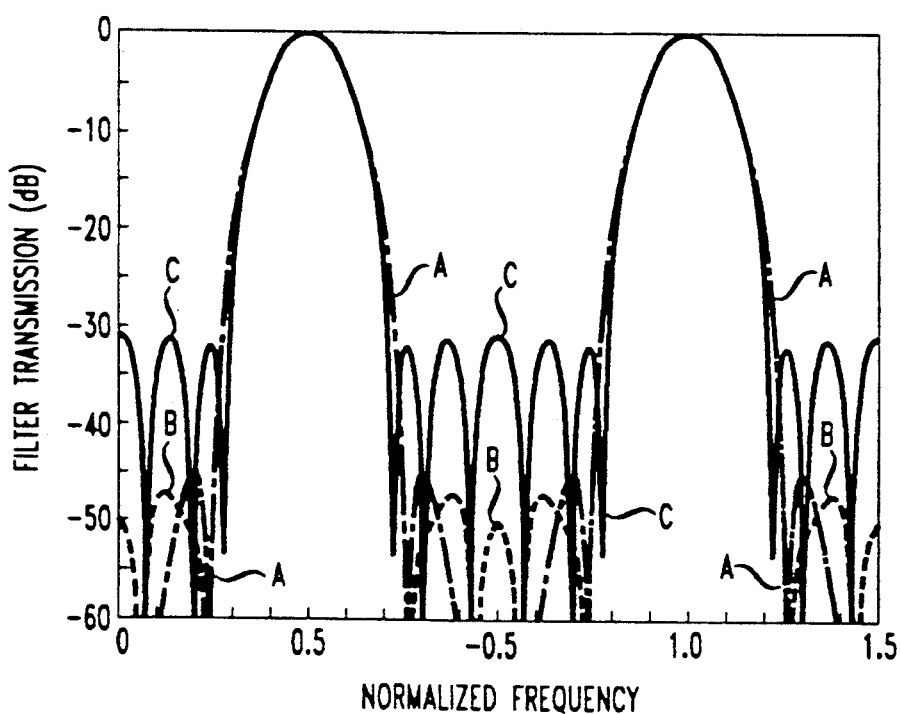
FIG. 4 is a set of transmission spectra of illustrative filters with a tenth-order binomial weighting function. This figure illustrates the effect of truncation on filter performance. Curve A represents a ten-stage filter without truncation. Curve B represents an eight-stage filter (one term is dropped from each end of the binomial distribution). Curve C represents a six-stage filter (two terms are dropped from each end of the binomial distribution).

Shown in FIG. 4 are the transmission spectra of a 10-stage filter with full binomial weighting (A), an eight-stage filter with M=10 and r=1 (B), and a six-stage filter with M=10 and r=2 (C). It is evident from the figure that truncation to eight, and even to six, stages has a negligible effect on the peak width. With truncation to eight stages, the sidelobe amplitude remains below $-45$ dB, but with truncation to six stages, this amplitude increases to $-31$ dB.

Such a six-stage filter can be used to select, e.g., every fourth channel out of the WDM input signal, with crosstalk below $-30$ dB. In general, the maximum allowable value for r, the number of omitted coupling segments, will depend on the sidelobe level allowed for the particular application.

As noted, curves A and B of FIG. 3 represent the theoretical number of stages required to achieve a given finesse in a filter with full binomial weighting. Similarly, curves C and D represent the required number of stages in a filter with truncated binomial weighting (at, respectively, the $-20$ dB and $-3$ db levels).

For each of the data points of curves C and D, r assumes the highest value for which the sidelobe amplitude will remain below $-30$ dB. Thus, for example, the lowest point of each curve corresponds to N=5, M=7, and r=1. The highest point corresponds to N=12, M=28, and r=8. These data suggest that to keep the sidelobe amplitude below −30 dB, the largest coupler weight should be about 6–7 times the smallest coupler weight, regardless of the number of stages. To further suppress the sidelobes, this ratio should generally be made still higher.

Surprisingly, curves C and D suggest that in a filter with truncated binomial weighting and a sidelobe amplitude below a fixed level, the number of stages required to achieve a given finesse does not grow quadratically, but instead grows approximately linearly with finesse. As a consequence, the required number of stages can be substantially reduced relative to the filter with full binomial weighting. For example, a reduction from 16 to 9 stages is achieved at a finesse (at the −3 dB level) of 8, and still greater reductions are expected at higher values of the finesse.

Figure 5:
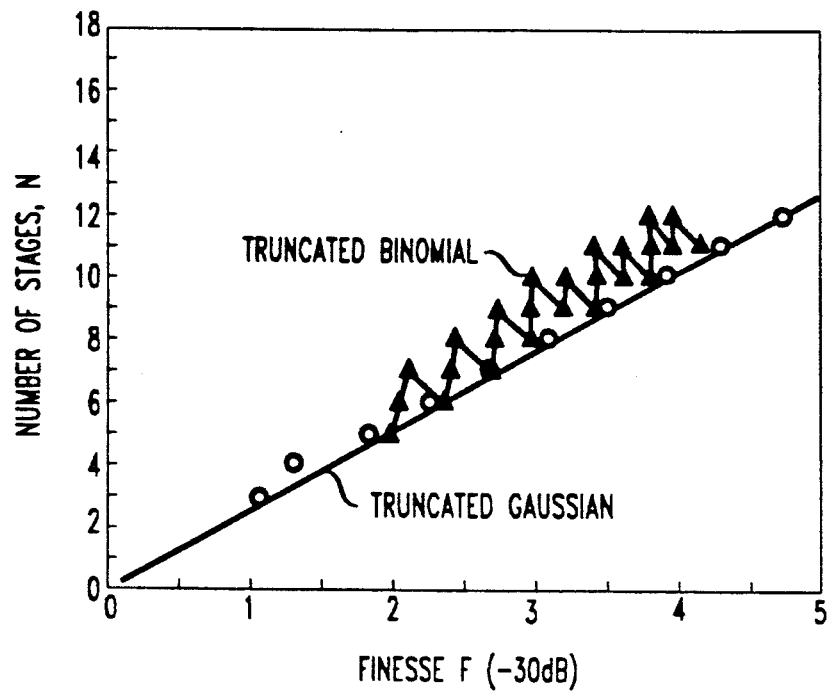
FIG. 5 is a graph showing the number of filter stages required to achieve a given value of the filter finesse for illustrative truncated binomial and truncated Gaussian filters, with finesse based on peak width at the $-30$ dB level.

It should be noted in this regard that (at least for a sufficiently large number of filter stages) a Gaussian weighting distribution will approximate the binomial distribution, and will give qualitatively similar filter performance. In particular, a truncated Gaussian weighting function $G_t(\mu, \nu_t)$ is expressed by $$G_t(\mu,\nu_t) = \exp\left(-\frac{(i-1-\mu)^2}{2\nu_t}\right),$$

where $$\mu = \frac{N}{2}, \nu_t = \frac{N^2}{8\ln t},$$

and t is the ratio of the peak of the distribution to the smallest weight in the truncated distribution. As is apparent in FIG. 5, the number of stages of a truncated Gaussian filter needed to achieve a given finesse is approximately the same as that needed for the corresponding truncated binomial filter. The required number of stages grows approximately linearly with finesse.

Figure 6:
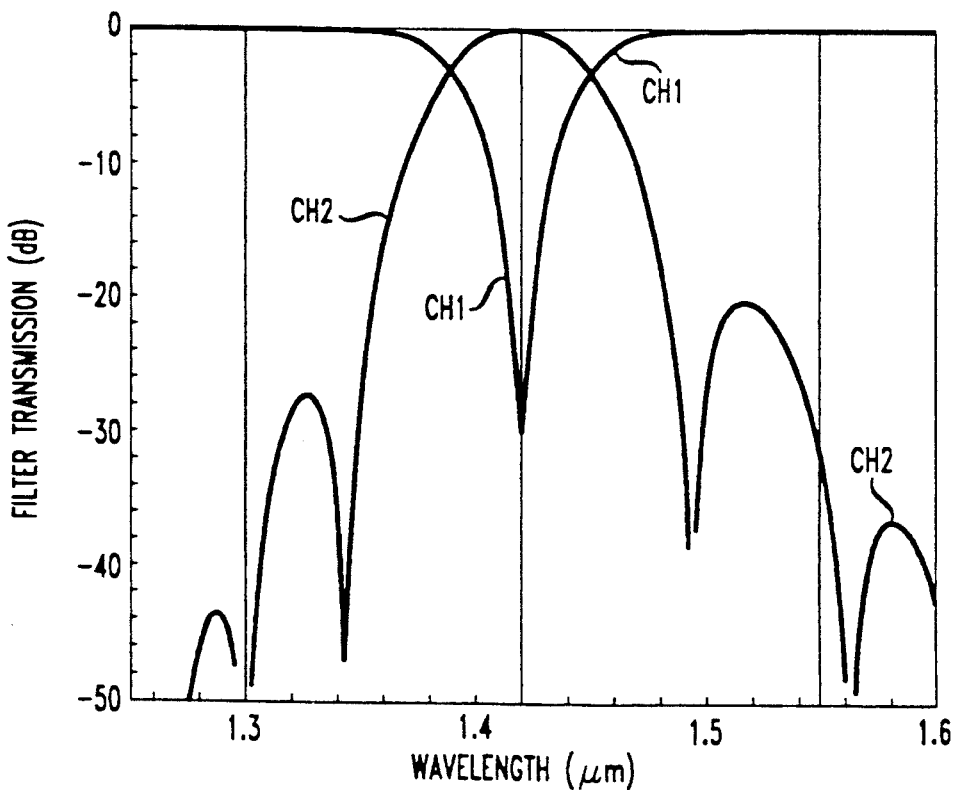
FIG. 6 shows the Ch. 1 and Ch. 2 transmission spectra of an illustrative filter having cosine weighting. This filter is designed to have passbands at useful communication wavelengths.

As noted, the inventive filter is useful, inter alia, as an adding/dropping filter for optical communication networks. For example, we have designed a filter, with cosine coupling, which will pass, e.g., communication signals at 1.3 and 1.55 μm in Ch. 1, and, e.g., diagnostic signals at 1.42 μm in Ch. 2. This filter has five stages (six coupling sections), and the respective coupling strengths are optimized to provide a full power transfer from Channel 1 to Channel 2 at 1.42 μm. The theoretical Ch. 1 and Ch. 2 transmission spectra of this filter are shown in FIG. 6.

A filter of this kind is readily implemented in glass waveguides overlying a silicon substrate, according to well-known SiOB techniques. A typical waveguide for this purpose includes a core of phosphorus-doped silica, 5 μm wide and 4.5 μm thick. The core is deposited on a silica lower cladding 15 μm thick, and is overlain by a phosphorus- and boron-doped silica upper cladding 7–15 μm thick. The effective refractive index of this waveguide is typically about 1.445. (The precise value depends on the width of the waveguide core.)

In each stage of a typical, seven-stage filter, the upper waveguide (as viewed in FIG. 1) undergoes one sinusoidal cycle over a longitudinal distance of about 5400 μm, with a peak-to-valley amplitude of about 103 μm. The lengths of the coupling segments range from about 240 μm to about 440 μm, and the combined length of all of the coupling segments is about 2700 μm. In each coupling segment, the center-to-center separation between the upper and lower waveguides is about 11–15 μm.

Because the composition of the waveguides and the lengths of the waveguides can be stringently controlled, the main source of fabrication error will be the width of the waveguides, which will, in turn, affect the effective refractive index in the waveguides. However, we expect that the average effective refractive index will be controllable within an error of about $\pm 3 \times 10^{-4}$, leading to a typical error in the peak wavelength (at a design wavelength of 1.42 μm) of only about ±3 Å. Additional fluctuations in phase, due to fluctuations in waveguide dimensions during processing, may increase this error by a small factor, exemplarily by about ±10–15 Å.

Figure 7:
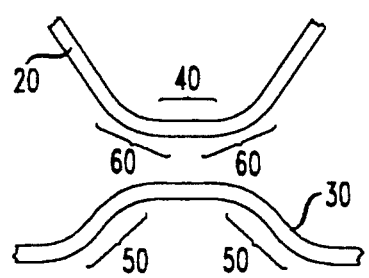
FIG. 7 is a schematic diagram showing a detail of FIG. 1.

The coupling between the upper and lower waveguides does not fall sharply to zero at the ends of the coupling sections. Instead, the coupling falls continuously as the upper and lower waveguides diverge. As a consequence, those portions of the filter stages that lie near the ends of the coupling sections make a small additional contribution to the coupling, denoted "residual coupling." Residual coupling is undesirable because it complicates the theoretical calculation of the path-length difference in each section of the filter. One approach to reducing this complication is depicted in FIG. 7. According to this approach, lower waveguide 30 includes decoupling sections 50 which increase the divergence between waveguide 30 and upper waveguide 20 near the ends of coupling sections 40. Each decoupling section is preferably made as a mirror image of adjacent portion 60 of upper waveguide 20. As a result, the decoupling section will have a minimal effect on the path-length difference between the upper and lower waveguides in regions where there is significant residual coupling.

We claim:

1. A spectrally discriminating optical filter which comprises a substrate having a longitudinal axis and first and second optical waveguides formed on the substrate, said waveguides having respective first and second effective refractive indices, wherein:
   a) the filter is subdivided into N stages, N at least 2, and N+1 approximately equally spaced-apart coupling sections, such that each stage is situated between two coupling sections;
   b) the first waveguide is optically coupled to the second waveguide in each of the coupling sections; and
   c) the optical path length within each stage is greater in the first waveguide than in the second waveguide,

CHARACTERIZED IN THAT d) the first and second effective refractive indices are nominally equal.

2. The filter of claim 1, wherein:
   a) each coupling section is bounded at each end by one of 2N+2 decoupling sections; and
   b) within each decoupling section, the first and second waveguides diverge symmetrically, such that no substantial optical path-length difference accrues between said waveguides within said section.

3. The filter of claim 1, wherein:
   a) the average distance between the first and second waveguides is smaller in the coupling sections than in the stages, whereby optical coupling is effected in the coupling sections; and b) each coupling section has an effective length $L_i$ and a coupling strength per unit length $\kappa_i$, i ranging from 1 to N+1, and further has a coupling strength approximately equal to $\kappa_i L_i$.

4. The filter of claim 3, wherein the coupling strength is maximal in the coupling section or sections nearest the center of the filter, and decreases symmetrically and monotonically toward the first and last coupling sections.

5. The filter of claim 4, wherein the coupling strengths are approximately distributed, relative to longitudinal position, according to one half-period of the cosine function.

6. The filter of claim 4, wherein the coupling strengths are approximately distributed, relative to longitudinal position, according to the binomial distribution.

7. The filter of claim 4, wherein the coupling strengths are approximately distributed, relative to longitudinal position, according to the Gaussian distribution.

8. The filter of claim 4, wherein the largest coupling strength is at least six times the smallest coupling strength.

9. The filter of claim 4, wherein the coupling strengths are approximately distributed, relative to longitudinal position, according to a binomial distribution of order M from which the first and last r terms are truncated, wherein M and r are positive integers, and $N = M - 2r$.

10. The filter of claim 9, wherein the truncated binomial distribution is approximated by a Gaussian distribution having a mean equal to $$\frac{N}{2} \text{ and a variance } v_t \text{ equal to } \frac{N^2}{8 \ln t},$$

and t is the ratio of the peak of the Gaussian distribution to the smallest coupling strength in the filter.

* * * * *